(12) United States Patent
Denis et al.

(10) Patent No.: US 7,189,441 B2
(45) Date of Patent: Mar. 13, 2007

(54) LOW INTRINSIC VISCOSITY AND LOW ACETALDEHYDE CONTENT POLYESTER, HOLLOW PREFORMS AND CONTAINERS OBTAINED FROM SAID POLYMER

(75) Inventors: Gérard Denis, Reims (FR); Murielle Vigny, Vittel (FR); Gérard Perez, Sainte-Foy-les-Lyon (FR); Jean-Luc Lepage, Francheville (FR)

(73) Assignee: Nestle Waters Management & Technology, Issy-les-Moulineaux (FR)

( * ) Notice: Subject to any disclaimer, the term of this patent is extended or adjusted under 35 U.S.C. 154(b) by 0 days.

(21) Appl. No.: 10/485,552

(22) PCT Filed: Jul. 11, 2002

(86) PCT No.: PCT/FR02/02463

§ 371 (c)(1),
(2), (4) Date: Jun. 7, 2004

(87) PCT Pub. No.: WO03/011940

PCT Pub. Date: Feb. 13, 2003

(65) Prior Publication Data
US 2004/0236065 A1 Nov. 25, 2004

(30) Foreign Application Priority Data
Jul. 31, 2001 (FR) ................... 01 10279

(51) Int. Cl.
*B29D 22/00* (2006.01)

(52) U.S. Cl. ............ 428/35.7; 264/176.1; 264/219; 428/36.92; 528/298; 528/300; 528/301; 528/302; 528/307; 528/308.6

(58) Field of Classification Search ......... 528/298, 528/300, 301, 302, 307, 308.6; 428/35.7, 428/36.92; 264/176.1, 219
See application file for complete search history.

(56) References Cited

U.S. PATENT DOCUMENTS

| | | | | |
|---|---|---|---|---|
| 4,554,329 | A | * 11/1985 | Sinker et al. | 525/437 |
| 4,609,721 | A | * 9/1986 | Kirshenbaum et al. | 528/285 |
| 5,292,865 | A | * 3/1994 | Kerpes et al. | 528/492 |
| 5,444,144 | A | * 8/1995 | Tanaka et al. | 528/503 |
| 5,573,820 | A | * 11/1996 | Harazoe et al. | 428/35.7 |
| 5,864,005 | A | * 1/1999 | Kim et al. | 528/176 |
| 6,099,778 | A | 8/2000 | Nelson et al. | |

FOREIGN PATENT DOCUMENTS

| | | |
|---|---|---|
| EP | 0 041 035 | 12/1981 |
| EP | 0 661 326 | 7/1995 |
| WO | WO 99 61505 | 12/1999 |
| WO | WO 99/61505 | * 12/1999 |

OTHER PUBLICATIONS

Patent Abstracts of Japan, vol. 014, No. 030 (C-678), Jan. 19, 1990 & JP 01 268719 A (Kanebo Ltd; Others: 01) Oct. 26, 1989.

* cited by examiner

*Primary Examiner*—Terressa Boykin
(74) *Attorney, Agent, or Firm*—Young & Thompson

(57) ABSTRACT

The invention concerns polyester resins, more particularly polyethyleneterephthalate resins used for making hollow containers, such as bottles for packaging liquid substances, in particular aerated beverages, natural or mineral waters. The invention concerns a polyester comprising at least 92.5% in number of recurrent units derived from terephthalic acid of aliphatic diols having an intrinsic viscosity ranging between 0.45 dl/g and 0.70 dl/g, and an acetaldehyde content less than 3 ppm, preferably less than 1.5 ppm. The invention also concerns a method for obtaining polyester granules with low acetaldehyde content having an intrinsic viscosity in the range mentioned above. Said polyesters are used in particular for making hollow containers such as bottles and more particularly bottles designed to contain foodstuffs sensitive to acetaldehyde.

29 Claims, No Drawings

LOW INTRINSIC VISCOSITY AND LOW ACETALDEHYDE CONTENT POLYESTER, HOLLOW PREFORMS AND CONTAINERS OBTAINED FROM SAID POLYMER

The present invention relates to polyester resins, in particular polyethylene terephthalate resins used in the production of hollow containers such as bottles for the packaging of liquid substances, in particular carbonated drinks and natural or mineral water.

For several tens of years, polyester, in particular polyethylene terephthalate, better known by the abbreviation PET, has been increasingly used in the production of hollow containers, in particular bottles.

Of the constraints imposed on PET for its use in this field, the transparency of the containers obtained is one of the most important. Copolymers mainly containing recurring ethylene glycol terephthalate units, but also containing other recurring units derived from the presence of monomers other than terephthalic acid and ethylene glycol have been proposed for many years, in particular by European patent 41035. These monomers are known as crystallisation retarders and are present in the polyester in variable concentrations of, for example, between 3.5% and 7.5% of all diacid monomers.

The other constraint which the polyester has to satisfy is the acetaldehyde content of the container walls. In fact, acetaldehyde is a product resulting from the degradation of polyester, which forms at high temperature during the production of polyester and from the bottle manufacturing process, in particular during the preform injection-moulding stage. Numerous patents have described various processes either for obtaining a polyester having a low acetaldehyde content or for limiting the formation thereof during the shaping processes.

An industrially employed technique described, in particular, in European patent 41035 involves polycondensation of the polyester in a molten medium to a degree of polymerisation which is limited so as to avoid the formation of large amounts of degradation products which generally generate acetaldehyde when the polyester is heated to temperatures higher than 200° C., for example. The polyester thus obtained is subjected to polymerisation again in the solid phase, generally known as post-condensation in the solid phase and carried out at a lower temperature of approx. 200 to 220° C., generally under a nitrogen atmosphere. During this operation, the polyester is polycondensed to a sufficiently high degree of polycondensation or intrinsic viscosity to obtain the desired mechanical properties and, in particular, the acetaldehyde formed during polycondensation in a molten medium as well as the large majority of degradation products are eliminated.

With this process it is possible to obtain polyester resins containing less than 2 ppm, or even less than 1 ppm of acetaldehyde.

However, this stage of polycondensation in the solid phase necessitates special equipment and consumes energy. Furthermore, the use of polyester resins having a high intrinsic viscosity and therefore low fluidity in a molten medium, is detrimental to the injection-moulding cycles (period between the beginning of injection-moulding and the ejection of the part from the mould). However, it appeared difficult to propose a polyester resin satisfying the criteria concerning acetaldehyde without employing a stage of polycondensation in the solid phase and therefore to use a polyester having a low degree of polymerisation with a low acetaldehyde content and also with the lowest possible acetaldehyde formation rate during the injection-moulding stage, for producing preforms and bottles having the stipulated acetaldehyde content.

One of the main aims of the present invention is to overcome these drawbacks by proposing a polyester resin having a low degree of polycondensation and a low acetaldehyde content for producing bottles suitable, in particular, for the packaging of liquid commodity foods such as carbonated drinks, natural water or carbonated or non-carbonated mineral water.

For this purpose, the invention proposes a polyester containing at least 92.5%, by number of recurring units derived from terephthalic acid, of aliphatic diols, characterised in that it has an intrinsic viscosity between 0.45 dl/g and 0.70 dl/g and an acetaldehyde content lower than 3 ppm, preferably lower than 1.5 ppm.

This polymer is advantageously crystallised to prevent the polyester from bonding or sticking, at a temperature lower than about 200° C. The polyester can therefore be treated to obtain a crystallisation rate which is advantageously higher than 15%.

Advantageously, the intrinsic viscosity of the polymer is between 0.45 dl/g and 0.65 dl/g.

The term intrinsic viscosity (IV) denotes the viscosity of a polymer solution at zero concentration. This value is calculated by formula (I) below by determining a viscosity index (VI) in dl/g measured on a polymer solution containing 0.5 g of polymer/100 ml of a solvent consisting of orthodichlorobenzene and phenol (50/50 by weight) at 25° C. in accordance with the standard ISO 1628/5 dated 15 Jun. 1986. For the polyesters of the invention, the intrinsic viscosity (IV) in dl/g is calculated by the following formula I:

$$IV = -10^{-1} VI^2 + 0.94 VI + 0.0122 \qquad (I)$$

Advantageously, the polyester is obtained from terephthalic acid, its esters or a mixture thereof and of aliphatic diols such as ethylene glycol, 1,3-propanediol or 1,4-butanediol.

The preferred monomers are terephthalic acid and ethylene glycol, which lead to polyethylene terephthalate, better known by the abbreviation PET, as mentioned hereinbefore.

In the present document, the term PET also covers a homopolymer obtained merely from monomers of terephthalic acids or their esters such as dimethylterephthalate and ethylene glycol as well as copolymers containing at least 92.5% in number of recurring ethylene terephthalate units.

According to a preferred characteristic of the invention, the polyester contains at least one crystallisation retarder for slowing down or delaying crystallisation of the polyester, in particular during cooling of the moulded or injected article such as a preform, in order to obtain crystallisation into very small crystals, while avoiding spherolitic crystallisation, and to be able to produce a transparent article of which the walls do not exhibit haze, with acceptable mechanical properties.

These crystallisation retarders are difunctional compounds such as diacids and/or diols added to the mixture of monomers before or during polymerisation of the polyester.

Examples of diacids suitable as crystallisation retarder include isophthalic acid, naphthalene dicarboxylic acid, cyclohexane dicarboxylic acid, cyclohexane diacetic acid, succinic acid, glutaric acid, adipic acid, azelaic acid and sebacic acid and examples of suitable diols include aliphatic diols containing 3 to 20 carbon atoms, cycloaliphatic diols containing 6 to 20 carbon atoms, aromatic diols containing 6 to 14 carbon atoms and mixtures thereof such as diethylene glycol, triethylene glycol, the isomers of 1,4-cyclohexane di-methanol, 1,3-propane diol, 1,4-butane diol, 1,5-pentane diol, 3-methylpentanediol-2,4, 2-methylpentanediol-1,4, 2,2,4-trimethylpentanediol-1,3, 2-ethylhexanediol-1,3,2,2-diethylpropanediol-1,3, 1,3-hexanediol, 1,4-di(hydroxyethoxy)benzene, 2,2-bis(4-hydroxycyclohexyl)-propane, 2,4-dihydroxy-1,1,3,3-tetramethylcyclobutane, 2,2-bis(3-hydroxyethoxypenyl)propane, 2,2-bis(4-hydroxypropoxyphenyl)propane and mixtures thereof.

Diethylene glycol is often inherently present in the polyesters because it forms during synthesis by condensation of two ethylene glycol molecules. Depending on the desired concentration of recurring units containing a diethylene glycol (DEG) radical in the final polyester, diethylene glycol is added to the monomer mixtures or the conditions for synthesis of the polymer are controlled to limit the formation of diethylene glycol.

Advantageously, the molar concentration of diethylene glycol in the polyester relative to the numbers of moles of diacid monomers is lower than 3.5 mol %, preferably lower than 2 mol %.

With regard to other crystallisation retarders, the molar concentration based on the number of moles of all diacids in the monomer mixture and therefore in the polyester obtained is advantageously lower than 7.5%, providing that the DEG content is deducted from this value if it is present. In other words, the total molar concentration of crystallisation retarder should be lower than 7.5%, as mentioned in European patent 41035.

The polyester can obviously contain a mixture of crystallisation retarders of the acid and/or diol type.

If the preform injection-moulding process and hollow container-blowing process allow the cooling rates, in particular, to be controlled to avoid spherolitic crystallisation of the resin or if the bottles to be produced will not be translucent such as milk bottles, for example, the total concentration of crystallisation retarder may be very low, for example approx. at 1% or even zero, apart from the DEG formed during synthesis of the polyester.

According to a preferred embodiment of the invention, the polyester of the invention advantageously contains less than 4% of isophthalic acid and less than 3.5% of diethylene glycol, the content being expressed in mol % of crystallisation retarder based on the number of moles in all the diacid monomers.

The invention also relates to a process for producing a polyester according to the invention. This process comprises a first stage involving producing a polyester by a process of polymerisation in a molten medium to obtain a resin having an intrinsic viscosity which is advantageously between 0.45 and 0.8 dl/g and preferably between 0.45 and 0.75 dl/g.

In a second stage, the polyester is put into the form of granules by any suitable process known in the technical field of polymer production. These granules are subjected to a crystallisation stage to prevent the granules from agglomerating when they are brought to a temperature lower than 200° C., for example between 130° C. and 200° C. In other words, the crystallisation stage should allow formation of at least a skin or external surface which is sufficiently crystallised to prevent bonding when the granules are brought to a temperature of approx. 200° C. This stage may be carried out by keeping the granules at a temperature between 120° C. and 170° C. or by treating them with hot water, for example with boiling water, at a temperature between 80° C. and 100° C. or any other suitable means of obtaining the above-mentioned result.

In a third stage, the polyester granules are heat treated by maintaining a temperature between 130° C. and 200° C., advantageously between 150° C. and 180° C. to reduce the acetaldehyde concentration to a value lower than 3 ppm and obtain a polyester having an intrinsic viscosity lower than 0.70 dl/g.

According to a characteristic of the invention, the thermal treatment is carried out in the presence of a gas, preferably by scavenging the mass of granules with a gas having a dew point higher than −60° C., advantageously between −60° C. and 20° C. and, in a preferred embodiment, between 10° C. and 20° C.

Gas scavenging is carried out either through a fixed bed of granules or through a fluidised bed of granules, the scavenging gas advantageously being the granule fluidising gas.

Advantageously, when the polyester to be treated has an intrinsic viscosity between 0.7 and 0.8 dl/g, the scavenging gas has a dew point between −10° C. and 20° C. (inclusive). In this embodiment, the treatment process according to the invention can comprise two successive stages consisting of a first stage of treatment with a gas having a high moisture content, even water vapour, to cause a rapid reduction in the intrinsic viscosity, followed by scavenging with a dry gas to remove the acetaldehyde while limiting variation of the intrinsic viscosity.

Gas suitable for the invention is advantageously air, nitrogen, carbon dioxide or any other gas which does not break down the polyester.

In a further preferred embodiment of the invention, the polyester obtained by polycondensation in a molten medium has a low intrinsic viscosity, for example between 0.45 and 0.65 dl/g, and the heat treatment can be carried out with a gas having a low dew point, for example between −60° C. and 0° C. During this treatment, the intrinsic viscosity (IV) may be increased slightly but advantageously remains at a value lower than 0.70 dl/g, preferably lower than 0.65 dl/g.

Advantageously, this heat treatment is carried out at a temperature between 130° C. and 200° C. for a period of a few hours to several tens of hours. The duration of treatment is determined so as to obtain the desired acetaldehyde content and intrinsic viscosity.

As mentioned hereinbefore, the treated polyester is obtained by processes of polycondensation in the molten phase, generally in the molten phase under reduced pressure as described in the literature for more than 50 years.

A process of this type comprises a first stage of esterification or transesterification in the presence or absence of catalysts. The hydrolysed or esterified material obtained is then polycondensed under reduced pressure in the presence of catalysts such as antimony, titanium or germanium compounds, for example. In this stage, alcohol or water is removed to allow the polycondensation reaction to progress.

According to the invention, this polycondensation is stopped when the degree of polycondensation or the intrinsic viscosity has reached the desired value of lower than 0.8 dl/g, preferably lower than 0.75 dl/g.

The polyester obtained is poured into dies for obtaining rods which are then transformed into granules by cutting. To allow formation of these rods, however, the polyester must advantageously have a sufficiently high intrinsic viscosity, for example higher than 0.45 dl/g.

According to a further embodiment of the invention, the polyester can contain a monofunctional monomer, preferably a monoacid, to limit development of the degree of polycondensation during the heat treatment for reducing the acetaldehyde content. The molar content of monofunctional monomer is between 0.5 and 3 mol %, based on all the diacid monomers. Thus, monoacids suitable for the invention include benzoic acid, naphthalenic acid, aliphatic acids having a boiling point compatible with the process for synthesis of the polyester, in other words advantageously at least higher than that of ethylene glycol or the esters thereof or alcohols such as cyclohexanol or aliphatic alcohols also advantageously having a boiling point higher than that of ethylene glycol.

The granules with a low acetaldehyde content obtained by the process according to the invention and having an acetaldehyde content and an intrinsic viscosity according to the invention are preferably used as raw materials for the production of hollow containers such as bottles.

Various additives such as brighteners, dyes or other additives such as light or heat stabilisers or antioxidants, may be added to the polyesters according to the invention either during the polymerisation stage or to the molten polyester prior to injection-moulding.

These granules are advantageously dried to obtain a moisture content lower than 50 ppm, preferably lower than 20 ppm. This drying stage is not compulsory if the moisture content of the polyester is sufficiently low.

The granules are then introduced into injection-moulding/blowing processes to produce hollow containers such as bottles. These processes which are described in numerous publications and are widely used industrially, comprise a first stage of injection-moulding to produce preforms. In a second stage, the cooled or uncooled preforms are heated and then blown to the shape of the desired bottles, optionally with double drawing.

The preforms are obtained, for example, by fusion of the resin in a single- or double-screw injection-moulding machine and this also allows plasticization of the polyester and the feeding thereof under pressure into a distributor equipped with heated nozzles and gate pins, for example at a temperature between 260° C. and 285° C.

The resin is injected into at least one mould of the preform equipped with cooling means adapted to control the cooling rate thereof and thus prevent spherolitic crystallisation and yield a preform which does not exhibit haze in the walls or opaque walls, preferably if this result is desired.

After cooling, the preform is ejected and cooled at ambient temperature or introduced directly, without cooling, into a blowing installation as described hereinbefore.

In this process for producing preforms, the polyester is melted at a temperature of approx. 280° C., for example between 270 and 285° C., then injected into moulds. The lowest possible injection-moulding temperature will be used to limit the formation of acetaldehyde, in particular to reduce the rate of acetaldehyde formation.

The process for producing the preform preferably employs a pressure for injecting the molten resin into the mould(s) of between $2.5.10^7$ Pa (250 bar) and $5.10^7$ Pa (500 bars) at a temperature between 260° C. and 270° C. This pressure range is lower than that used for polyester resins having a higher intrinsic viscosity, namely higher than 0.70 dl/g.

A further advantage is that the moulds are cooled to a temperature between 0° C. and 10° C. This cooling is achieved using any suitable coolant such as glycol water. Advantageously, the injection-moulding and cooling cycle is approx. 10 seconds to 20 seconds.

The polyester forming the wall of the preform obtained by this process has an intrinsic viscosity between 0.45 dl/g and 0.70 dl/g, advantageously between 0.45 dl/g and 0.65 dl/g.

The acetaldehyde content in the preform is lower than 10 ppm, preferably lower than 6 ppm.

The preforms thus obtained are generally used in blowing processes for bottle production. These blowing processes are also widespread and described in numerous publications.

They generally involve introducing the preform into a blowing installation with or without over-drawing comprising heating means.

The preform is heated at least above the Tg (glass transition point) of the polymer then pre-blown by injection of a gas under pressure at a first pressure for a first period.

A second injection of a gas at a second pressure produces the final shape of the bottle prior to ejection thereof after cooling.

Advantageously, the heating temperature for the preform is between 80° C. and 100° C. This heating is carried out using any suitable means, for example infrared rays directed toward the external surface of the preform.

Advantageously, pre-blowing of the preform takes place at a first pressure of between $4.10^5$ Pa and $10.10^5$ Pa (4 bars and 10 bars) for a period of between 0.15 and 0.6 seconds.

The second blowing operation is carried out under a second pressure of between $3.10^6$ Pa and $4.10^6$ Pa (30 and 40 bars) for a second period of between 0.3 and 2 seconds.

As known, a drawing rod may also be introduced into the preform during the pre-blowing and/or blowing operations in order to partially draw the preform.

The use of a polyester according to the invention leads to bottles or hollow containers having a low acetaldehyde content. Therefore, the invention relates to bottles of which the wall-forming polyester has an intrinsic viscosity between 0.45 and 0.70 dl/g and an acetaldehyde content lower than 6 ppm.

Furthermore, this substance allows the production of bottles having an identical content, with mechanical properties at least equivalent to those obtained with a polyester having a higher intrinsic viscosity.

The invention also relates to hollow containers such as bottles obtained with a polyester according to the invention and by the injection-moulding/blowing processes described in the present application. However, hollow containers obtained by shaping a polyester according to the invention, this shaping being carried out by processes other than those described in the present application, also form part of the present invention.

The bottles according to the invention are used for packaging any liquid product, in particular for packaging liquid commodity foods such as sweet carbonated or non-carbonated drinks known by the general name of soda, the various natural, spring, carbonated or non-carbonated mineral waters.

Further detailed advantages of the invention will emerge from the following examples given merely as an illustration.

In the following examples, the acetaldehyde concentration is determined by the following method of analysis:

a sample of granules (about 4 g) is crushed in a cryogenic crusher under liquid nitrogen to yield a powder which passes through a 800 μm mesh screen (for example: crushing in a Spex 6700 brand cryogenic crusher operating for 2 min with the frequency regulator in the minimum position and for 5 min with the frequency regulator in the maximum position) and advantageously having a grain size between 200 μm and 400 μm (crushing should be carried out under conditions which do not break down the polymer).

500 mg of this powder, weighed substantially exactly, are placed in a closed head-space tube.

this head-space tube is placed in a vapour phase chromatographic analyser (Perkin Elmer HS 40 head-space and VARIAN 3500 chromatograph with a PORAPLOTQ column and a gas vector consisting of helium at a rate of 5 ml/min) and a temperature varying from 60° C. to 230° C. (rising at a rate of +10° C./min).

the head-space tube is kept at 145° C. for 90 minutes.

The chromatograph is calibrated with solutions of acetaldehyde in dimethylacetamide.

EXAMPLE 1

A copolyester containing 2.3 mol % of isophthalic acid, based on the total diacid monomer content, as crystallisation retarder, with terephthalic acid and ethylene glycol as further monomers, is produced in a polycondensation installation comprising a 7.5 l reactor, in the presence of 250 ppm, expressed as antimony, of antimony oxide as catalyst.

Polymerisation is stopped when the intrinsic viscosity of the polyester is 0.48 dl/g and contains 3.4 mol % of DEG, based on the number of moles of diacid monomers. The polymer is put into granule form by extrusion into rods which are cut to yield granules having an average mass of 13 mg per granule.

The residual acetaldehyde content in the amorphous granules, determined by the aforementioned method, is 140 ppm.

The granules are crystallised in an oven for 30 minutes at 160° C. then placed in a column. A dry air flow (dew point lower than −60° C.) is passed through the column at a flow rate of 0.39 Nm³/h for 8 hours, the temperature of the granules being kept at 180° C.

After a treatment period of 8 hours, the polyester has an intrinsic viscosity of 0.56 dl/g and an acetaldehyde content of 0.75 ppm. This polyester is known as polyester A.

EXAMPLES 2 TO 5

A polyester containing 2.3 mol % of isophthalic acid is produced by a mode of operation identical to that of example 1. However, polycondensation is stopped when the intrinsic viscosity is equal to 0.64 dl/g.

The amorphous granules have an acetaldehyde content of 45 ppm and 3.4 mol % of DEG.

The granules are crystallised by keeping them in an oven at 160° C. for 30 minutes.

The granules are subjected to treatments with various gases and at different temperatures to remove the acetaldehyde, using the mode of operation described in example 1.

The treatment conditions and the acetaldehyde contents and intrinsic viscosity are compiled in Table I below:

TABLE I

| Ex | Gas | Temperature | Duration (h) | AA content (ppm) | IV dl/g | Polymer |
|---|---|---|---|---|---|---|
| 2(1) | Dry air | 183° C. | 10.30 | 0.8 | 0.60 | B |
| 3 | Air (dew point −10° C.) | 185° C. | 8 | 1.3 | 0.63 | C |
| 4 | Air (dew point +18° C.) | 185° C. | 8 | 1.5 | 0.60 | D |
| 5 | Air (dew point +18° C.) | 200° C. | 8 | 1.6 | 0.56 | E |

(1)pre-treatment with water vapour instead of air is carried out for half an hour at the beginning of the process Polymers B to E obtained in these examples have improved colouring. This improvement is manifested by a reduction in the yellowness index. The presence of moisture limits deterioration of the yellowness index of the polyester.

EXAMPLE 6

A homopolyester is produced by adding 2.6 mol % of benzoic acid, based on terephthalic acid, using the mode of operation described in example 1.

Polycondensation is stopped when the intrinsic viscosity is 0.47 dl/g.

After granulation, the polymer obtained contains 70 ppm of acetaldehyde and 3.5 mol % of DEG. After crystallisation and treatment with dry air (dew point −60° C.) at 180° C. for 8 hours using the mode of operation of example 1, the granules have an intrinsic viscosity of 0.53 dl/g and an acetaldehyde content of 1.6 ppm. This polymer will be called polymer F.

EXAMPLES 7 TO 9

Certain polyesters obtained according to the foregoing examples are used to produce bottles by the process described hereinafter:

The polyester granules are melted in an endless single-start screw with a sheath temperature of 285° C. The molten polyester is fed into a preform injector marketed under the name "HUSKY 48 preform machine with XL 300 cavities" with an injection-moulding temperature of between 262° C. and 266° C. and a pressure of 450 bars. The preforms are cooled by circulating water at a temperature of 8.5° C. The total cycle time for injection-moulding is 15.7 s.

After the preforms have been cooled, they are fed to a blowing installation for producing bottles having a capacity of 0.5 l and having a neck in the shape designated by the standardised name 28 PCO and a base of petaloid shape with 5 petals. This installation is marketed under the name "SIDEL SBO 1 F2 Lab". The preforms are heated to the temperature shown in the table below. Pre-blowing is carried out for 0.19 s at a blowing pressure of 8.5 bars. Blowing is carried out for 1.78 s at a blowing pressure of 38 bars. The speed of the drawing tube is 1.2 m/s.

The characteristics of the bottles obtained and of the blowing process are shown in the table below for each polyester used.

TABLE II

| | | Example | |
|---|---|---|---|
| | 7 | 8 | 9 |
| Polyester | A | B | F |
| Preform temperature | 87° C. | 96° C. | 89° C. |
| Bursting pressure | 13.84 bars | 15.68 bars | 13.84 bars |
| Planar draw ratio | 11.9 | 11.9 | 11.9 |
| Density (g/cm³) Shoulder | 1.363 | 1.3625 | 1.364 |
| Middle | 1.3615 | 1.3632 | 1.363 |
| Bottom | 1.3612 | 1.3643 | 1.3622 |
| Acetaldehyde content | 2.85 ppm | 3.05 ppm | 3.00 ppm |

The viscosity of the polyester forming bottle walls is approximately the same as that of the polyesters used.

The invention claimed is:

1. A polyester polymer resin comprising:
   at least 92.5% of recurring polymer units derived from terephthalic acid and ethylene glycol; and
   0.5% to 3% of a monofunctional compound, based on the number of moles of diacid, wherein,
   said polyester polymer resin has an intrinsic viscosity of between 0.45 dl/g and 0.65 dl/g and an acetaldehyde content lower than 1.5 ppm, and
   wherein said monofunctional compound is selected from the group consisting of monocarboxylic acids containing benzoic acid, naphthalenic acid, aliphatic acids or esters thereof, alcohols containing cyclohexanol, and aliphatic alcohols.

2. The polyester polymer resin according to claim 1, further comprising at most 7.5 mol% of at least one crystallization retarding compound based on the total number of moles of diacids.

3. The polyester polymer resin according to claim 2, wherein the crystallization retarder is selected from the group consisting of a diacid compound other than terephthalic acid, a diol compound, and mixtures thereof.

4. The polyester polymer resin according to claim 3, wherein the diacid crystallization retarder is selected from the group consisting of isophthalic acid, naphthalene dicarboxylic acid, cyclohexane dicarboxylic acid, cyclohexane diacetic acid, succinic acid, glutaric acid, adipic acid, azelaic acid and sebacic acid.

5. The polyester polymer resin according to claim 3, wherein the diol crystallization retarder is selected from the group consisting of diethylene glycol, triethylene glycol, the isomers of 1,4-cyclohexane di-methanol, 1,3-propane diol, 1,4-butane diol, 1,5-pentane diol, 3-methylpentanediol-2,4, 2-methylpentanediol-1,4, 2,2,4-trimethylpentanediol-1,3, 2-ethylhexanediol-1,3, 2,2-diethylpropanediol-1,3, 1,3-hexanediol, 1,4-di (hydroxyethoxy)-benzene,2,2-bis (4-ydroxycyclohexyl)propane, 2, 4-dihydroxy-1,1,3,3-tetramethylcyclobutane, 2,2-bis (3-hydroxy-ethoxypenyl)-propane, 2,2-bis (4-hydroxypropoxyphenyl) propane and mixtures thereof.

6. A process for producing a polyester polymer resin according to claim 1, comprising:
carrying out polycondensation in a molten medium of a polyester having an intrinsic viscosity (IV) lower than 0.80 dl/g;
forming granules of said polyester;
crystallizing said granules to form said polyester polymer resin;
heat treating said crystallized granules of said polyester polymer resin by heating to a temperature between 130° C. and 200° C. for a time sufficient to reduce the acetaldehyde concentration to a value lower than 1.5 ppm and obtain an intrinsic viscosity IV of the polyester polymer resin between 0.45 dl/g and 0.65 dl/g.

7. The process according to claim 6, wherein the heat treatment is carried out by scavenging said granules with a gas having a dew point higher than −60° C.

8. The process according to claim 7, wherein the dew point of the gas is between −10° C. and 20° C., inclusive.

9. The process according to claim 6, wherein the gas is selected from the group consisting of air, nitrogen and carbon dioxide.

10. The process according to claim 6, wherein the polyester granules are crystallized to form said polyester polymer resin by heating to a temperature between 120° C. and 170° C.

11. The process according to claim 6, wherein the polyester granules are crystallized to form said polyester polymer resin by treatment of the granules with water at a temperature between 80° C. and 100° C.

12. The process according to claim 7, wherein the polyester obtained by polycondensation in the molten phase prior to crystallizing and heat treating has an intrinsic viscosity IV between 0.45 and 0.80 dl/g.

13. The process according to claim 7, wherein the heat treatment is carried out using a fixed bed of polyester polymer resin granules traversed by a scavenging gas.

14. The process according to claim 7, wherein the heat treatment is carried out using a fluidized bed of polyester polymer resin granules, the scavenging gas fluidizing the granules.

15. A process for producing preforms from a polyester polymer resin according to claim 1, wherein said process comprises:
injecting the molten polyester polymer resin into at least one mould of the preform to be obtained,
rapidly cooling the preform to prevent spherolitic crystallization.

16. The process according to claim 15, wherein the polyester polymer resin is dried prior to injection-moulding to reduce the water content to a value lower than 50 ppm.

17. The process according to claim 15, wherein the molten polyester polymer resin is injected into at least one heated nozzle and at least one heated gate pin, prior to introduction into the at least one mould, said nozzles and gate pins being heated to a temperature between 260° C. and 285° C.

18. The process according to claim 15, wherein the pressure at which the molten resin is injected into the at least one mould is between $2.5.10^7$ Pa (250 bars) and $5.10^7$ Pa (500 bars) at a temperature between 260° C. and 270° C.

19. The process according to claim 15, wherein the at least one mould is cooled to a temperature between 0° C. and 10° C.

20. Preforms obtained by the process according to claim 15, wherein the intrinsic viscosity of the polyester is between 0.45 dl/g and 0.59 dl/g.

21. The preform according to claim 20, wherein the acetaldehyde content is lower than 6 ppm.

22. Hollow containers or bottles obtained by blowing the preforms according to claim 15.

23. A hollow container or bottle, comprising a wall formed from a polyester polymer resin, wherein said wall of said container or said bottle has an intrinsic viscosity between 0.45 and 0.59 dl/g and an acetaldehyde content lower than 6 ppm.

24. The polyester polymer resin according to claim 1, wherein the intrinsic viscosity is between 0.45 dl/g and 0.56 dl/g.

25. The process according to claim 6, wherein said obtained polyester polymer resin has an intrinsic viscosity of between 0.45 dug and 0.56 dl/g.

26. The process according to claim 20, wherein said polyester polymer resin has an intrinsic viscosity of between 0.45 dl/g and 0.56 dl/g.

27. The hollow container or bottle according to claim 23, wherein the hollow container or bottle has an intrinsic viscosity of between 0.45 dl/g and 0.56 dl/g.

28. A crystallized polycondensed polyester comprising:
at least 92.5% of recurring units of ethylene terephthalate;
a monofuctional compound selected from the group consisting of monocarboxylic acids containing benzoic acid, naphthalenic acid, aliphatic acids or esters thereof, alcohols containing cyclohexanol, and aliphatic alcohols; and
an intrinsic viscosity of between 0.45 dl/g and 0.65 dl/g and an acetaldehyde content lower than 1.5 ppm;
wherein said polycondensed polyester is produced from polycondensed mixture of terephthalic acid, ethylene glycol, and 0.5% to 3% of a monofunctional compound, based on the number of moles of diacid.

29. A process for producing a crystallized polyester resin, comprising:
carrying out polycondensation in a molten medium to produce a prepolymer having an intrinsic viscosity (IV) of between 0.45 and 0.80 dl/g;
forming granules of said prepolymer;
crystallizing said granules;
heat treating said crystallized granules by heating to a temperature between 130° C. and 200° C. by scavaging said granules with a gas having a dew point between −60° C. and 0° C. for a time sufficient to produce a crystallized polyester resin having a acetaldehyde concentration to a value lower than 1.5 ppm and an intrinsic viscosity IV of between 0.45 dl/g and 0.65 dl/g.

* * * * *